United States Patent [19]
Mercer

[11] Patent Number: 5,927,142
[45] Date of Patent: *Jul. 27, 1999

[54] SYSTEM AND METHOD FOR DETERMINING DRAIN PAN FLUID LEVEL

[75] Inventor: Gary L. Mercer, Eaton, Ohio

[73] Assignee: Henny Penny Corporation, Eaton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/985,677

[22] Filed: Dec. 5, 1997

[51] Int. Cl.$^6$ ................................................. G01F 23/20
[52] U.S. Cl. .................................... 73/296; 99/403
[58] Field of Search ........................ 73/291, 292, 296, 73/862.541, 862.621; 99/403, 400, 425, 446

[56] References Cited

U.S. PATENT DOCUMENTS

| | | |
|---|---|---|
| 4,050,447 | 9/1977 | Terracciano . |
| 4,420,006 | 12/1983 | Moore et al. . |
| 4,478,140 | 10/1984 | Bullock . |
| 4,599,990 | 7/1986 | Fritzsche et al. . |
| 4,646,793 | 3/1987 | Sherratt . |
| 4,677,964 | 7/1987 | Lohmeyer et al. .................. 73/296 X |
| 4,890,548 | 1/1990 | Grob et al. . |
| 4,899,649 | 2/1990 | Grob et al. . |
| 4,930,408 | 6/1990 | King et al. . |
| 4,974,501 | 12/1990 | Grob et al. . |
| 5,033,368 | 7/1991 | Brewer . |
| 5,056,364 | 10/1991 | Kahler et al. ............................. 73/296 |
| 5,722,289 | 3/1998 | Carr .......................................... 73/302 |
| 5,776,530 | 7/1998 | Davis et al. .............................. 99/403 |
| 5,812,060 | 9/1998 | DeSpain et al. ...................... 73/305 X |

*Primary Examiner*—Richard Chilcot
*Assistant Examiner*—Jewel Thompson
*Attorney, Agent, or Firm*—Baker & Botts, LLP

[57] ABSTRACT

A fryer drain pan fluid level sensing system includes a fryer frame and a fryer vessel mounted on the fryer frame. A drain pan carrying frame is pivotally affixed at a first carrying frame end to the fryer frame, and a drain pan mounted on the drain pan carrying frame for receiving a fluid, which has a fluid density, from a fryer vessel, such that the fluid in the drain pan has a fluid level and a surface area, together defining a fluid volume. A load sensor supports a second carrying frame end opposite the first carrying frame end and generates a force signal proportionate to a weight of the fluid in the drain pan and the drain pan. A processor receives the force signal from the load sensor and determines the fluid level. The processor may determine the fluid level by calculating a fluid level factor by comparing a first difference between the force signal and an empty drain pan signal to a second difference between a full drain pan signal and the empty drain pan signal and then multiplying the fluid level factor by a predetermined full level. Alternatively, the processor may determine the fluid level by scaling the force signal to determine a weight of the fluid in the drain pan, by dividing the weight by the fluid density to determine the fluid volume, and by dividing the fluid volume by the surface area to determine the fluid level.

25 Claims, 8 Drawing Sheets

SYSTEM AND METHOD FOR DETERMINING DRAIN PAN FLUID LEVEL

BACKGROUND OF THE INVENTION

1. Field of the Invention

The invention relates generally to systems and methods for determining the level of a fluid in a drain pan and, in particular, to systems and methods for determining the level of a fluid in a drain pan using a load sensor.

2. Description of the Related Art

Known fryers may include a fryer frame, a fryer vessel mounted on the fryer frame, a drain pan for receiving a fluid drained from a fryer vessel, and a processor for controlling the operation of the fryer. The fluid may be a cooking medium, such as vegetable oil or shortening. It is desirable to drain such cooking media from the fryer vessel periodically for replacement or filtering. Alternatively, the fluid may be a cleaning fluid, such as water or a detergent or a combination thereof, which may be used to clean the fryer vessel or other fryer components including a drain valve through which fluid is drained to the drain pan or the drain pan itself Because periodic draining of fluids from the fryer vessel to the drain pan is a necessary step in the operation of the fryer, it is important to accurately determine the level of any fluid that may be added to or may already be in the drain pan. If fluid is already in the drain pan, further draining may cause the drain pan to overflow causing fluid to spill onto fryer components or onto the floor surrounding the fryer. Such spillage may result in damage to components of the fryer or even fire if the cooking media or cleaning fluids should come in contact with heater elements or electrical circuitry. Exposure of electrical circuitry to these fluids poses a particular danger of damage because the spillage may result in the short circuiting of electric components.

Such spillage may create other problems. For example, the spillage of cooking media or cleaning fluids may result in employees slipping on the spilled fluid. Moreover, such spillage is generally unsanitary and may present a medium for the growth of bacteria or fungus in the area surrounding the fryer.

A further consideration with respect to the efficient operation of a fryer is that by avoiding such spillage, the fryer may be operated in a more cost effective manner. By avoiding spillage, less employee time is spent cleaning up such spills, and fryer operating time is not lost due to the need to clean the fryer and its surroundings. Further, if a cooking medium is to be drained, filtered, and reused; the loss of some portion of the cooking medium represents a cost increase due to the replacement costs for such lost cooking medium.

SUMMARY OF THE INVENTION

A need has arisen for a system and method for measuring the level of fluid in a fryer drain pan. It is advantageous to know this level for various reasons. For example, fluid should not be drained to the drain pan if the drain pan is already full, because spillage may result. It is a feature of the invention that the fluid level is measured by converting the force resulting from the fluid mass to an electrical signal by means of a load sensor, such as a strain-gage load cell. It is an advantage of this invention that a relatively uncomplicated, mechanical configuration is used to transfer the force from the fluid in the drain pan to the load cell.

In an embodiment of the invention, a fryer drain pan fluid level sensing system comprises a fryer frame and a fryer vessel mounted on the fryer frame. A drain pan carrying frame is pivotally affixed at a first carrying frame end to the fryer frame, and a drain pan is mounted on the drain pan carrying frame for receiving a fluid, which has a fluid density, from a fryer vessel, such that the fluid in the drain pan has a fluid level and a surface area, together defining a fluid volume. A load sensor supports a second carrying frame end opposite the first carrying frame end and generates a force signal proportionate to a weight of the fluid in the drain pan and the drain pan. A processor receives the force signal from the load sensor and determines the fluid level. The processor may determine the fluid level by calculating a fluid level factor by comparing a first difference between the force signal and an empty drain pan signal to a second difference between a full drain pan signal and the empty drain pan signal and then multiplying the fluid level factor by a predetermined full level. Alternatively, the processor may determine the fluid level by scaling the force signal to determine a weight of the fluid in the drain pan, by dividing the weight by the fluid density to determine the fluid volume, and by dividing the fluid volume by the surface area to determine the fluid level.

In another embodiment of the invention, a fryer comprises a fryer frame, a fryer vessel mounted on the fryer frame, a drain pan carrying frame pivotally affixed at a first carrying frame end to the fryer frame, a drain pan mounted on the drain pan carrying frame for receiving a fluid from a fryer vessel, and a processor for controlling the fryer. The fluid has a density and has a fluid level and a surface area in the drain pan, together defining a fluid volume. A load sensor supports a second carrying frame end opposite the first carrying frame end and generates a force signal proportionate to a weight of the fluid in the drain pan and the drain pan. The processor receives the force signal from the load sensor and determines the fluid level. Again, the processor may determine the fluid level by calculating a fluid level factor by comparing a first difference between the force signal and an empty drain pan signal to a second difference between a full drain pan signal and the empty drain pan signal and then multiplying the fluid level factor by a predetermined full level. Alternatively, the processor may determine the fluid level by scaling the force signal to determine a weight of the fluid in the drain pan, by dividing the weight by the fluid density to determine the fluid volume, and by dividing the fluid volume by the surface area to determine the fluid level.

In yet another embodiment, a method for determining a level of a fluid in a drain pan of a fryer, such as the fryer described above, comprises the steps of measuring a predetermined full level when the drain pan is full and the full drain pan signal is generated; generating a force signal proportionate to a weight of the fluid in the drain pan and the drain pan; calculating a fluid level factor by comparing a first difference between the force signal and an empty drain pan signal to a second difference between a full drain pan signal and the empty drain pan signal; and multiplying the fluid level factor by the predetermined full level.

In still another embodiment, a method for determining a level of a fluid in a drain pan of a fryer, such as the fryer described above, comprises the steps of generating a force signal proportionate to a weight of the fluid in the drain pan and the drain pan, determining the weight of the fluid by scaling the force signal, calculating the fluid volume by dividing the fluid weight by the fluid density, and calculating the fluid level by dividing the fluid volume by the fluid surface area.

Other objects, features, and advantages will be apparent to persons skilled in the relevant art in view of the following detailed description and the accompanying drawings.

BRIEF DESCRIPTION OF DRAWINGS

For a more complete understanding of the present invention and the advantages thereof, reference is now made to the following description taken in conjunction with the accompanying drawings, where like reference numerals represent like reference parts, wherein.

DETAILED DESCRIPTION OF PREFERRED EMBODIMENTS

Figure 1:
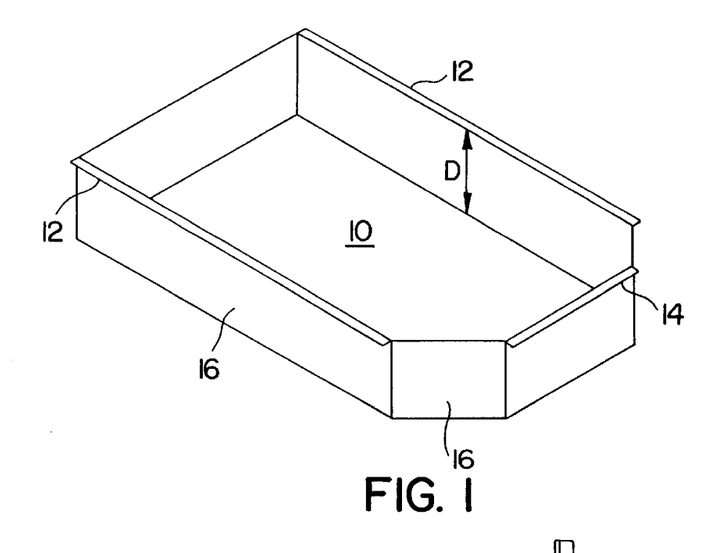
FIG. 1 is a perspective, overhead view of a drain pan.

Referring to FIG. 1, a drain pan 10 is depicted as having a plurality of side walls 16. Further, a pair of opposing side walls aligned with a longitudinal axis of pan 10 may be formed or equipped with drain pan supporting side lips 14 to engage the longitudinal arms of a drain pan carrying frame, as described below. Drain pan 10 also may include a drain pan supporting front lip 14 which may engage a carrying frame transverse arm, as described below. As may be seen from FIG. 1, drain pan 10 defines a maximum depth "D."

Figure 2:
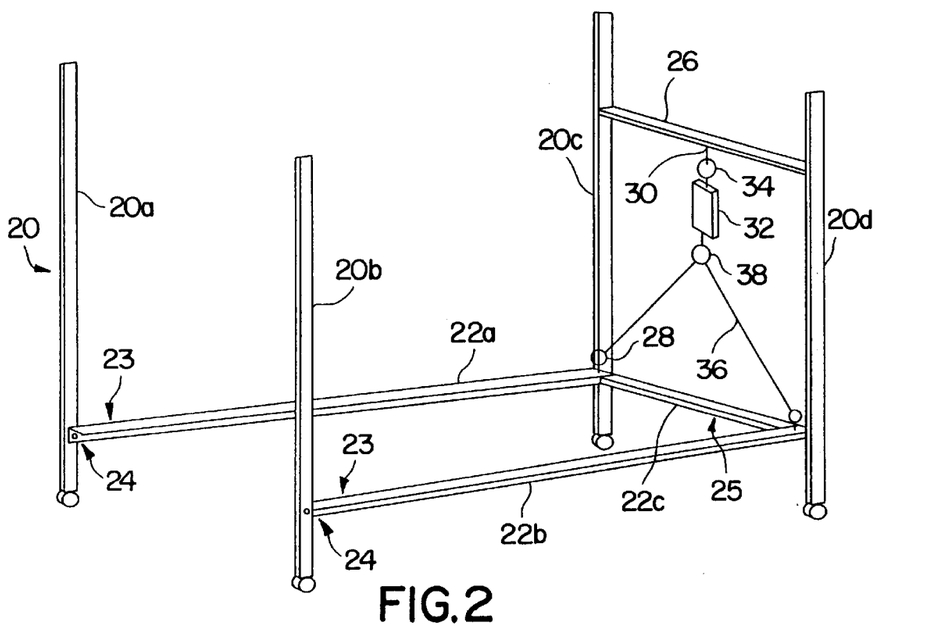
FIG. 2 is a perspective view of a fryer frame, a drain pan carrying frame, and a load sensor, according to a first embodiment of the invention.

In FIG. 2, a perspective view of a fryer frame, a drain pan carrying frame, and a load sensor is shown, according to a first embodiment of the invention. A fryer frame 20 may include four vertical frame supports 20a–d. Moreover, a drain pan carrying frame 22 may including first and second longitudinal arms 22a and 22b joined at one end by a transverse arm 22c to form a substantially U-shaped frame, i.e., drain pan carrying frame 22. A first carrying frame end 23, which is opposite transverse arm 22c, is pivotally affixed to fryer frame 20 at a pair of pivot points 24.

Figure 3:
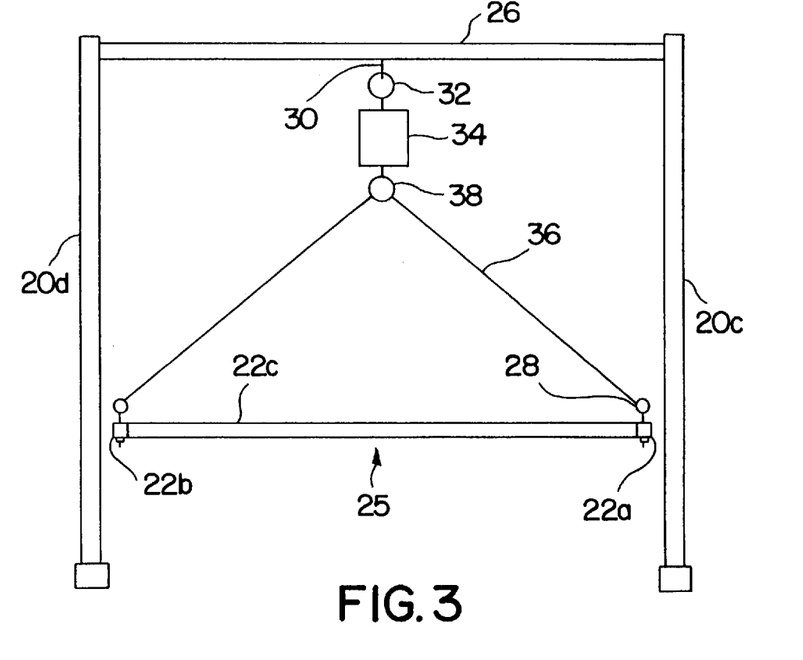
FIG. 3 is a frontal view of the fryer frame, a drain pan carrying frame, and a load sensor of FIG. 2.

A load sensor supporting bracket 26 extends between vertical frame supports 20c and 20d, and is positioned above transverse arm 22c of U-shaped frame 22. A supporting bracket connection 30, such as a U-shaped bolt, is suspended beneath bracket 26. A load sensor 34 is suspended from connection 30 by an upper load sensor connection 34. For example, load sensor 34 may be an Omega LCCB-100, manufactured by Omega Engineering, Inc. of Stamford, Conn. A cable 36 joins a pair of second carrying frame connecting points 28 to a lower load sensor connection 38, whereby U-shaped frame 22 is suspended beneath load sensor 34, as depicted in FIG. 3.

Figure 4A:
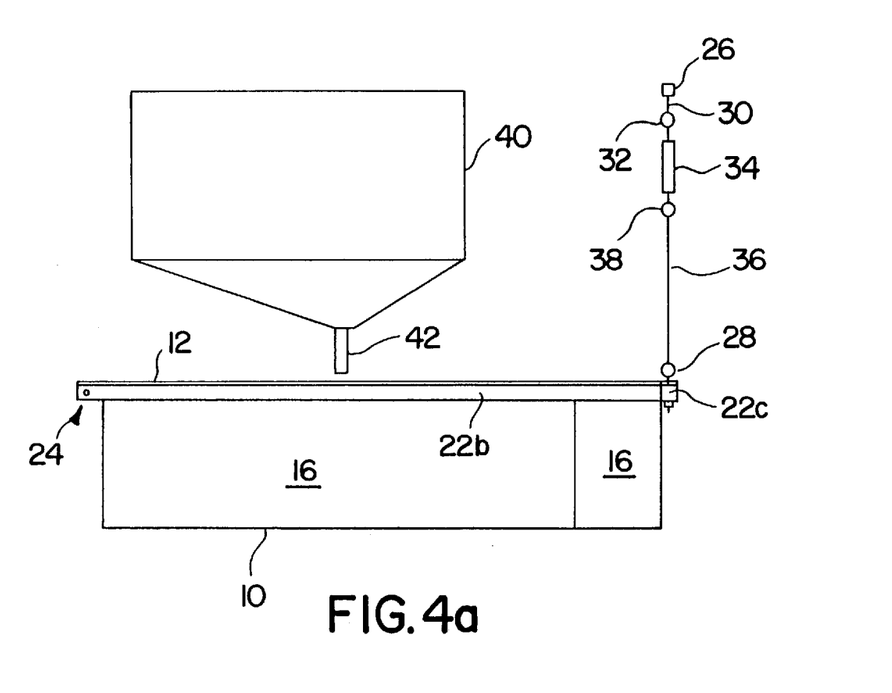
FIG. 4a is a side view of a drain pan mounted on the drain pan carrying frame, a fryer vessel with a drain valve positioned over the drain pan, and the load sensor, according to the embodiment of the invention depicted in FIGS. 1 and 2.
Figure 4B:
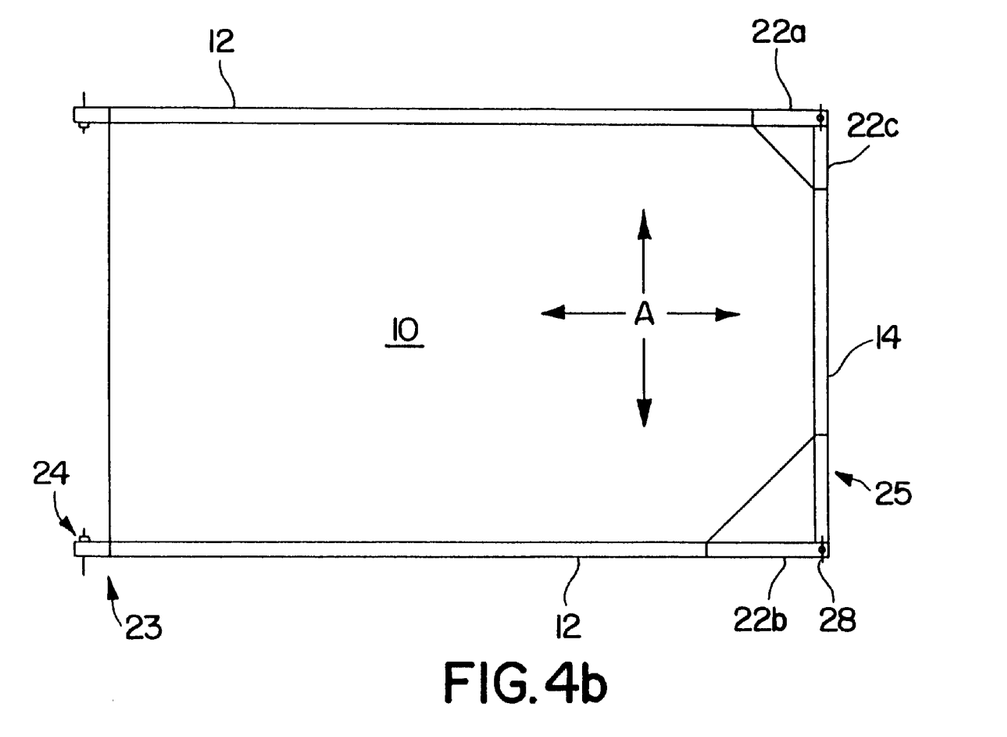
FIG. 4b is an overhead view of the drain pan mounted on the drain pan carrying frame, according to the embodiment of the invention depicted in FIGS. 1 and 2.

Referring to FIG. 4a, a side view of drain pan 10 mounted on drain pan carrying frame 22, a fryer vessel 40 with a drain valve 42 positioned over drain pan 10, and load sensor 34, is shown, according to the embodiment of the invention depicted in FIGS. 1 and 2. As depicted by FIG. 4a, drain pan supporting side lip 12 rests upon an upper surface of second longitudinal arm 22b, and drain pan supporting front lip 14 rests on transverse arm 22c to support drain pan 10 within U-shaped frame 22. Thus, drain pan side walls 16 extend below U-shaped frame 22. Referring further to FIG. 4b, an overhead view of drain pan 10 mounted on drain pan carrying frame 22, is shown, according to the embodiment of the invention depicted in FIGS. 1 and 2. In FIG. 1, the angled corners of drain pan 10 are depicted, which corners impart a pentagonal shape to the periphery of drain pan 10. As demonstrated by FIG. 4b, this pentagonal shape avoids interference between drain pan 10 and second carrying frame end connecting points 28, and as indicated by the letter "A" and the accompanying arrows, the shape of drain pan 10 substantially defines the surface area of a fluid in drain pan 10. Moreover, this shape facilitates the insertion and removal of drain pan 10 from U-shaped frame 22 at first carrying frame end 23.

Figure 5:
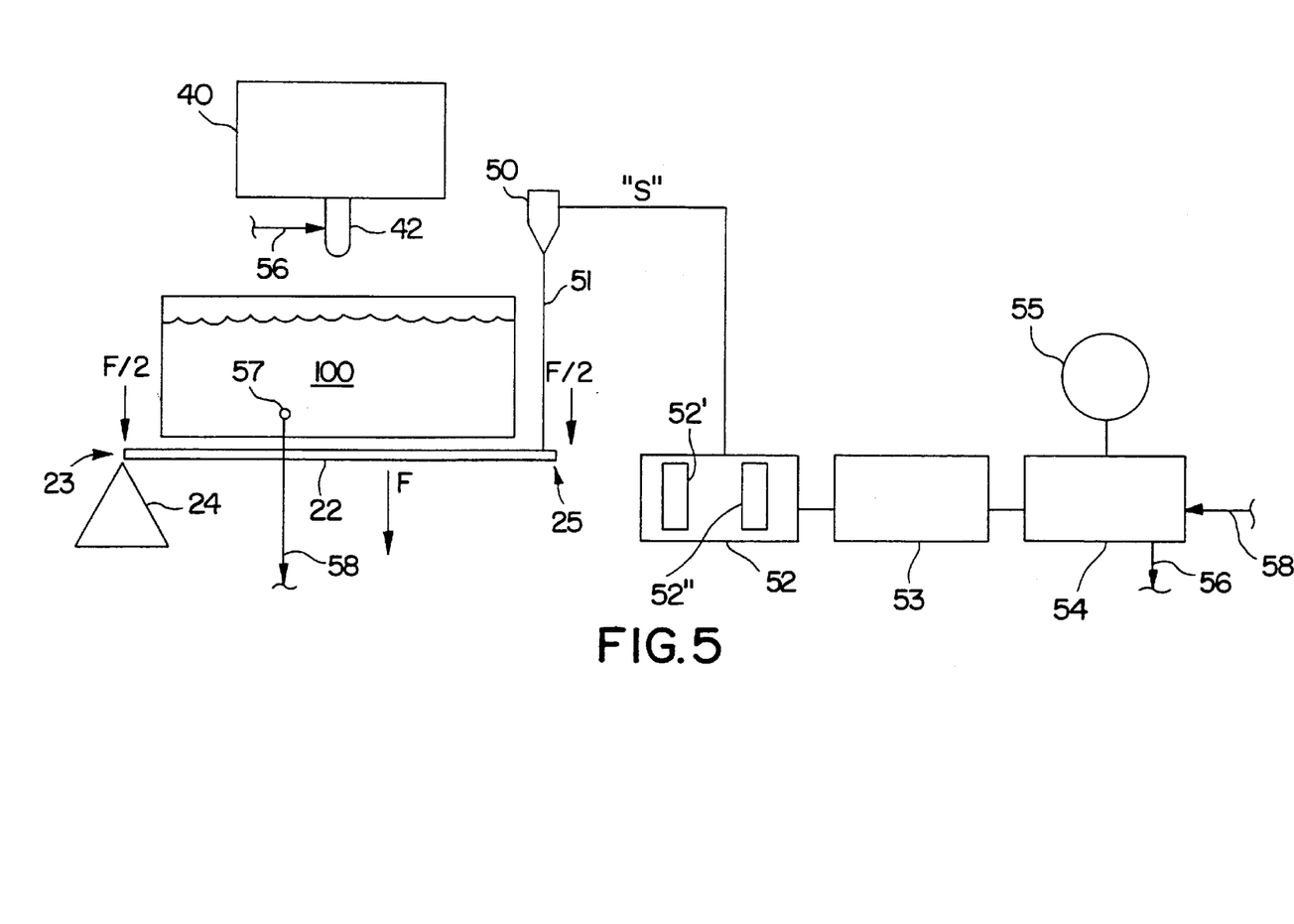
FIG. 5 is a schematic diagram of a system for determining the fluid level in a drain pan according to the embodiment of the invention depicted in FIGS. 1–4.

Referring to FIG. 5, a schematic diagram of a system for determining the fluid level in a drain pan is depicted, according to the embodiment of the invention depicted in FIGS. 1–4. Where appropriate, the same reference numerals used in FIGS. 1–4 have been used in FIG. 5 to identify similar components. Drain pan 10 rests upon drain pan carrying frame 22, and fryer vessel 40 equipped with drain valve 42 is positioned above drain pan 10. Drain pan carrying frame 22 is pivotally affixed at first carrying frame end 23 by a pivot 24 while second carrying frame end 25 is suspended from a load sensor 50 by a connecting arm or cable 51. Drain pan 10 contains a fluid 100, and drain pan 10 and fluid 100 exert a downward force on carrying frame 22 equal to "F." Given the shape of drain pan 10 and its position within carrying frame 22, equal downward forces of about F/2 are exerted on pivot 24 and against load sensor 50 through connecting arm or cable 51.

Load sensor 50 transmits a signal "S," e.g., a voltage signal to a signal conditioning device 52. For example, "$V_F$," may equal the voltage output of load sensor 50 when drain pan 10 is "full," i.e., when the level of a known fluid, such as shortening, in drain pan 10 is at a predetermined full level "$L_F$," such that $L_F$ is less than or equal to D; "$V_0$" may equal the voltage output of load sensor 50 when drain pan 10 is empty; and "$V_X$" may equal the voltage output of load sensor 50 when drain pan 10 is at an unknown level "$L_X$," such that $L_X$ is greater than zero and less than or equal to $L_F$. Consequently, the percentage "full" of drain pan 10 is determined by the following equation:

$$((V_X - V_0)/(V_F - V_0)) \cdot 100 = \text{Percentage of } L_F. \qquad \text{Eq. (1a)}$$

Referring again to FIG. 5, signal S may be sent to signal conditioning device 52, which may include a signal filter 52', such as a lowpass filter, and an amplifier 52". Signal S then is sent to an analog/digital convertor 53 and then to a processor 54, so that the level of fluid 100 within drain pan 10 may be determined. The determined level then is sent to a display 55, so that a fryer operator may be informed of the fluid level. Further, display 55 may include an alarm or warning light to alert the operator when the determined level reaches or exceeds a predetermined level. In this way, the operator may take action to empty drain pan 10 or otherwise prevent spillage. Moreover, processor 54 may automatically generate a signal, e.g., a signal sent via drain valve connection 56, to close drain valve 42 if the fluid level reaches the predetermined value.

In this configuration, load sensor 50 effectively supports about one-half of the weight "$W_{FD}$" of fluid 100 and drain pan 10. Consequently, the force F/2 indicated by load sensor 50 is about one-half the total force F exerted by fluid 100 and drain pan 10, and F is proportionate to $W_{FD}$. Processor 54 may include circuitry and process control software which supply calibration and scaling to eliminate the force due to drain pan 10. Signal S from load sensor 50 then may be scaled to determine the weight of the fluid "$W_F$," i.e., ($W_{FD} \cdot \alpha$)=$W_F$, where $\alpha$ is a scaling factor, and converted to an equivalent level measurement given the surface area A of drain pan 10 and the density "$d_F$" of the known fluid, in accordance with the following equation:

$$((W_{FD} \cdot \alpha)/d_F)/A = (W_F/d_F)/A = L_F \qquad \text{Eq. (2a)}$$

The system may compensate for fluid density variations resulting from changes in fluid temperature if a temperature sensor 57 is employed to measure the temperature of the fluid in drain pan 10, and if the volume of the fluid based on its weight is adjusted to reflect the fluid's density at the measured temperature. Information concerning variations in fluid density resulting from temperature changes may be stored in processor 54. In addition, drain pan 10 also may contain other components, such as a filter pan assembly. The weight of such additional components is fixed, and processor 54 may compensates by adjusting the scaling factor.

Figure 6:
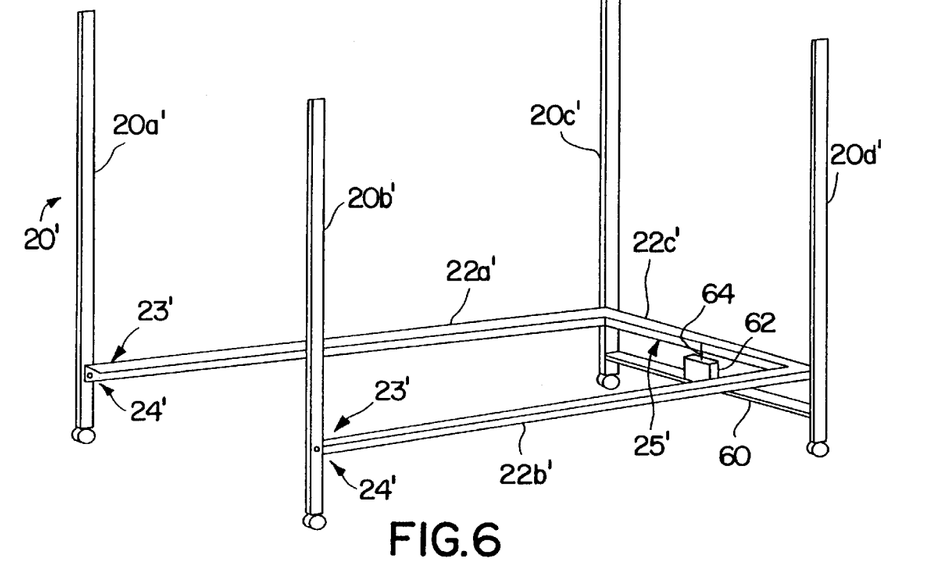
FIG. 6 is a perspective view of a fryer frame, a drain pan carrying frame, and a load sensor, according to a second embodiment of the invention.

In FIG. 6, a perspective view of a fryer frame, a drain pan carrying frame, and a load sensor is shown, according to a second embodiment of the invention. A fryer frame 20' may include four vertical frame supports 20a–d'. Moreover, a drain pan carrying frame 22' may including first and second longitudinal arms 22a' and 22b' joined at one end by a transverse arm 22c' to form a substantially U-shaped frame, i.e., drain pan carrying frame 22'. A first carrying frame end 23', which is opposite transverse arm 22c', is pivotally affixed to fryer frame 20' at a pair of pivot points 24'.

A load sensor supporting bracket 60 extends between vertical frame supports 20c' and 20d', and is positioned below transverse arm 22c' of U-shaped frame 22'. A load sensor 62 is positioned on supporting bracket 60, such that transverse arm 22c' rests upon senor 62. For example, load sensor 62 may be a Tedea-Huntleigh Model 1040 Series Low Profile Off-Center Load Cell, manufactured by Tedea-Huntleigh of Canoga Park, Calif. A sensor arm 64 supports transverse arm 22c' of U-shaped frame 22', whereby U-shaped frame 22 transfers a force to load sensor 62, as depicted in FIG. 7.

Figure 7:
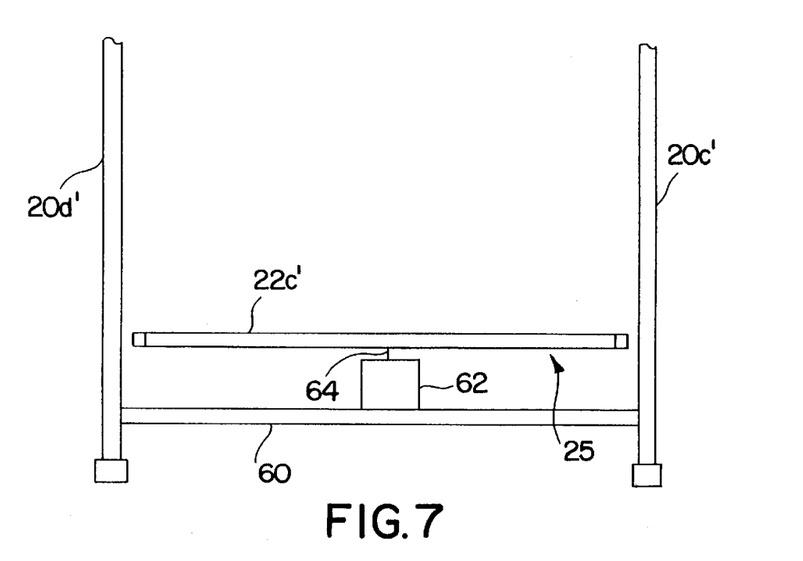
FIG. 7 is a frontal view of the fryer frame, a drain pan carrying frame, and a load sensor of FIG. 6.
Figure 8:
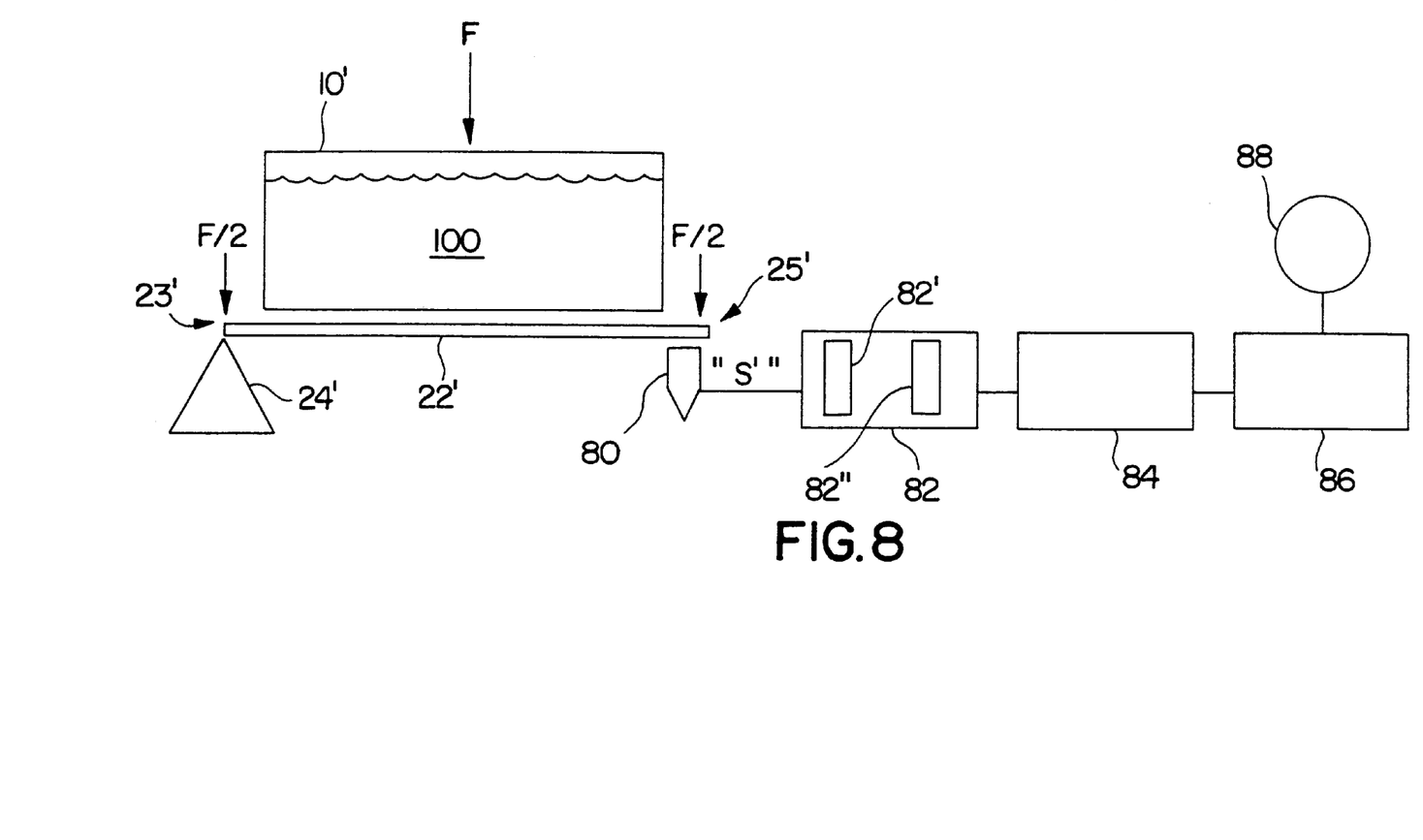
FIG. 8 is a schematic diagram of a system for determining the fluid level in a drain pan according to the embodiment of the invention depicted in FIG. 6.

Referring to FIG. 8, a schematic diagram of a system for determining the fluid level in a drain pan is depicted, according to the embodiment of the invention depicted in FIGS. 6 and 7. Where appropriate, the same reference numerals used in FIGS. 6 and 7 have been used in FIG. 8 to identify similar components. Drain pan 10' rests upon drain pan carrying frame 22'. Drain pan carrying frame 22' is pivotally affixed at first carrying frame end 23' by a pivot 24' while second carrying frame end 25' rests upon a load sensor 80. Drain pan 10' contains a fluid 100, and drain pan 10' and fluid 100 exert a downward force on carrying frame 22' equal to "F." Given the shape of drain pan 10' and its position within carrying frame 22', equal downward forces of about F/2 are exerted on pivot 24 and upon load sensor 80.

Load sensor 80 transmits a signal "S'," e.g., a voltage signal to a signal conditioning device 82. For example, "$V_F$" may equal the voltage output of load sensor 80 when drain pan 10' is "full," i.e., when the level of a known fluid, such as shortening, in drain pan 10' is at a predetermined full level "$L_F$," such that $L_F$ is less than or equal to D; "$V_0$" may equal the voltage output of load sensor 80 when drain pan 10' is empty; and "$V_X$" may equal the voltage output of load sensor 50 when drain pan 10' is at an unknown level "$L_X$," such that $L_X$ is greater than zero and less than or equal to $L_F$. Consequently, the percentage "full" of drain pan 10' is determined by the following equation:

$$((V_X - V_0)/(V_F - V_0)) \cdot 100 = \text{Percentage of } L_F. \qquad \text{Eq. (1b)}$$

Referring again to FIG. 8, signal S' may be sent to signal conditioning device 82, which may include a signal filter 82', such as a lowpass filter, and an amplifier 82". Signal S' then is sent to an analog/digital convertor 84 and then to a processor 86, so that the level of fluid 100 within drain pan 10' may be determined. The determined level then is sent to a display 88, so that a fryer operator may be informed of the fluid level. Further, display 88 may include an alarm or warning light to alert the operator when the determined level reaches or exceeds a predetermined level. In this way, the operator may take action to empty drain pan 10' or otherwise prevent spillage. Moreover, processor 86 may automatically generate a signal to close a drain valve (not shown) if the fluid level reaches the predetermined value.

In this configuration, load sensor 80 effectively supports about one-half of the weight "$W_{FD}$" of fluid 100 and drain pan 10'. Consequently, the force F/2 indicated by load sensor 80 is about one-half the total force F exerted by fluid 100 and drain pan 10, and F is proportionate to $W_{FD}$. Processor 86 may include circuitry and process control software which supply calibration and scaling to eliminate the force due to drain pan 10'. Signal S from load sensor 80 then may be scaled to determine the weight of the fluid "$W_F$," i.e., ($W_{FD} \cdot \alpha$)=$W_F$, where $\alpha$ is a scaling factor, and converted to an equivalent level measurement given the surface area A of drain pan 10' and the density "$d_F$" of the known fluid, in accordance with the following equation:

$$((W_{FD} \cdot \alpha)/d_F)/A = (W_F/d_F)/A = L_F \qquad \text{Eq. (2b)}$$

The system may compensate for fluid density variations resulting from changes in fluid temperature if a temperature sensor (not shown) is employed to measure the temperature of the fluid in drain pan 10', and if the volume of the fluid based on its weight is adjusted to reflect the fluid's density at the measured temperature. Information concerning variations in fluid density resulting from temperature changes may be stored in processor 86. In addition, drain pan 10 also may contain other components, such as a filter pan assembly. The weight of such additional components is fixed, and processor 86 may compensates by adjusting the scaling factor.

Figure 9A:
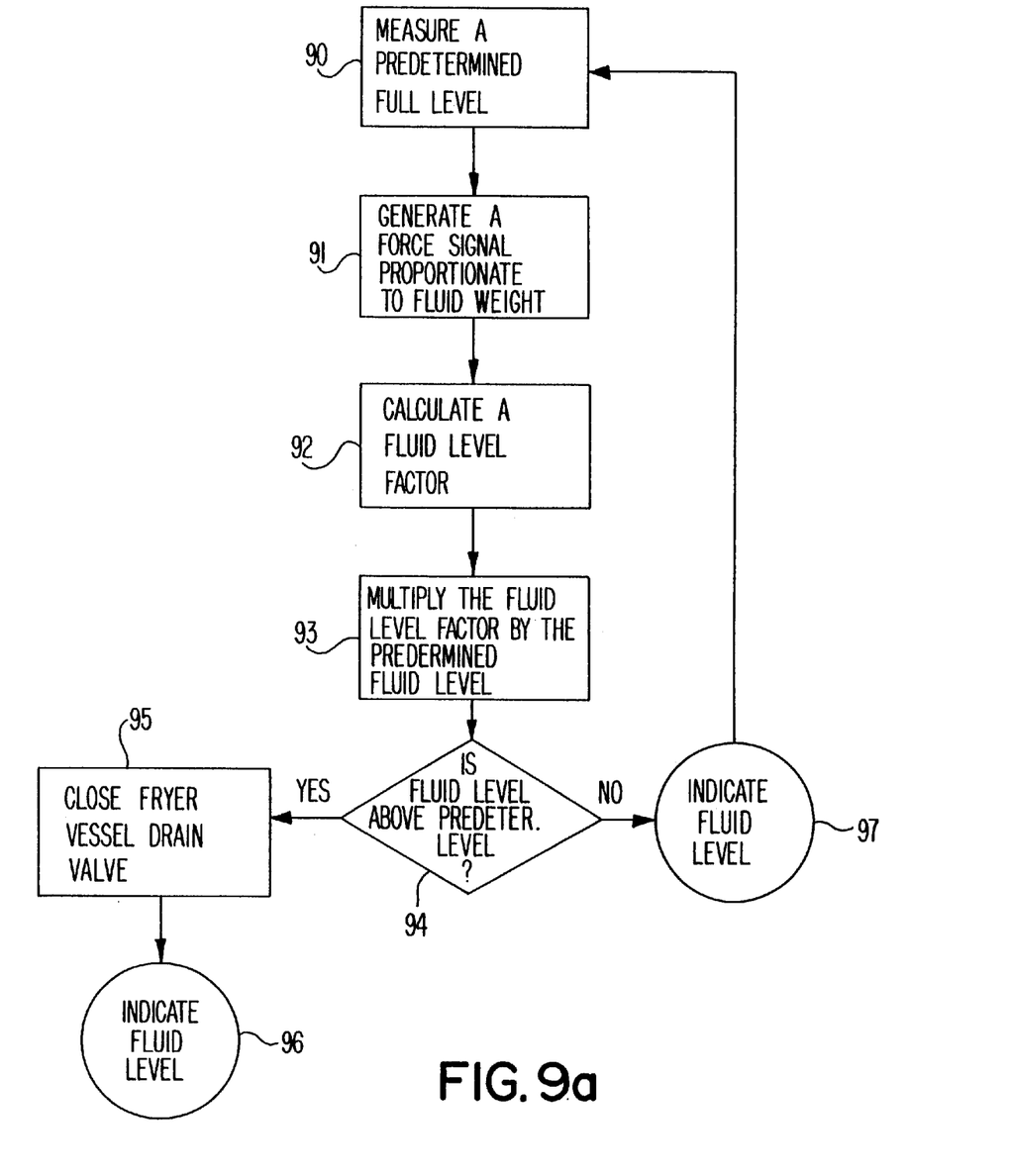
FIG. 9a is a flow chart of the steps of a first method for determining the fluid level in a drain pan.

Referring to FIG. 9a, a flow chart of the steps of a first method for determining the fluid level in a drain pan of a fryer is depicted. This fryer may comprise a fryer frame, a fryer vessel mounted on the fryer frame, a drain pan carrying frame pivotally affixed at a first carrying frame end to the fryer frame, a drain pan for receiving a fluid from a fryer vessel, and a processor for controlling the fryer. The fluid has a density, and a fluid level and a surface area in the drain pan together define a fluid volume. Further, a load sensor supports a second carrying frame end opposite the first carrying frame end. In step 90, a predetermined full level is measured when the drain pan is full, and the full drain pan signal is generated. In step 91, a force signal is generated which is proportionate to a weight of the fluid in the drain pan and the drain pan. In step 92, a fluid level factor is calculated by comparing a first difference between the force signal and an empty drain pan signal to a second difference between a full drain pan signal and the empty drain pan signal, and in step 93, the fluid level factor is multiplied by the predetermined full level. If, in step 94, the fluid level is above a predetermined fluid level, e.g., within a range of about 5% of the predetermined full level, a signal is sent to close the fryer vessel drain valve (step 95), and the fluid level is indicated on a display (step 96). If, however, the fluid level is not above a predetermined fluid level, the fluid level is indicated on a display (step 97), and the method returns to step 90.

Figure 9B:
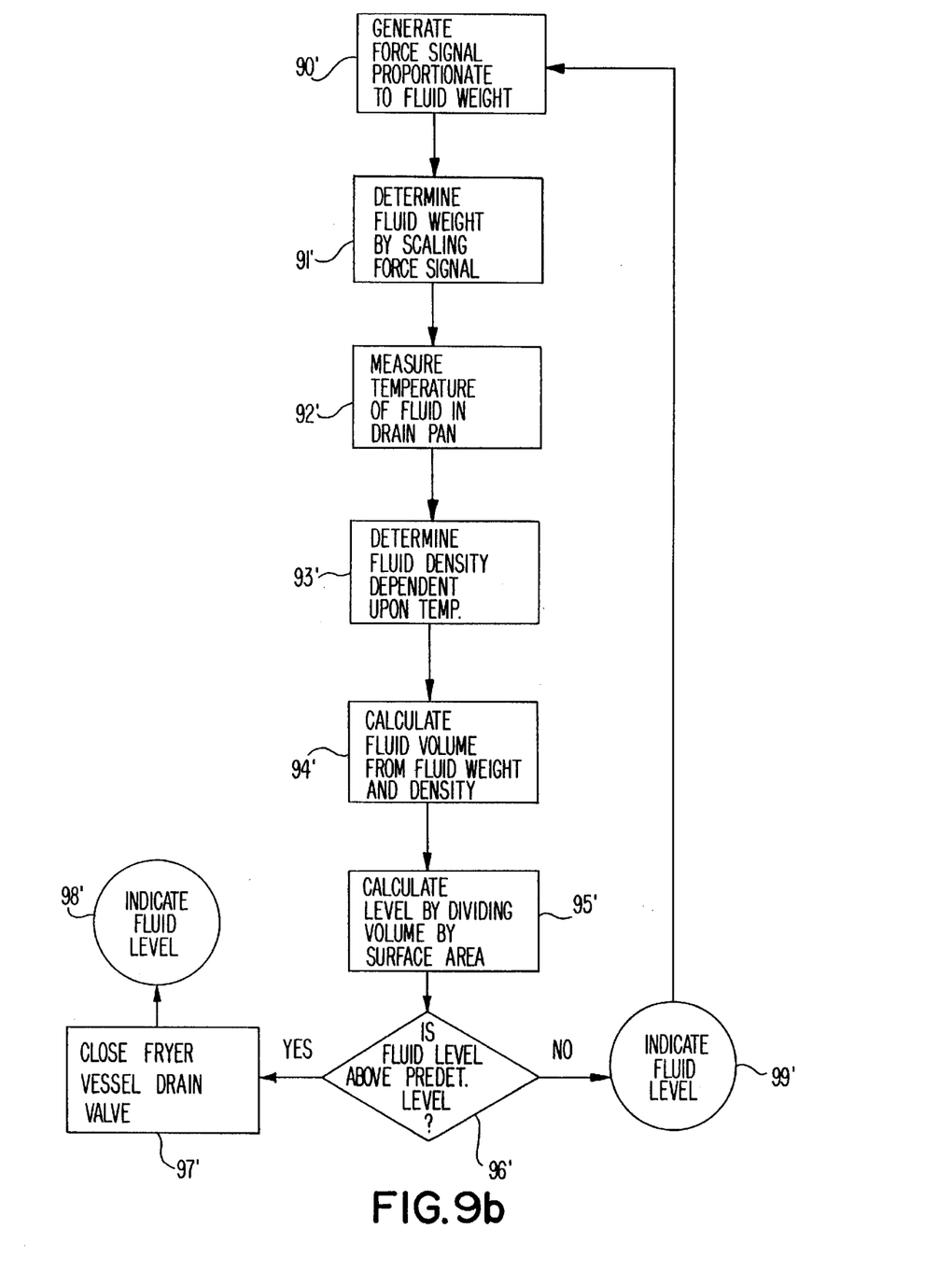
FIG. 9b is a flow chart of the steps of a second method for determining the fluid level in a drain pan.

Referring to FIG. 9b, a flow chart of the steps of a second method for determining the fluid level in a drain pan of a fryer is depicted. This fryer may be configured as described above. In step 90', a force signal is generated proportionate to a weight of the fluid in the drain pan and the drain pan. In step 91', the weight of the fluid is determined by scaling the force signal. In step 92', the temperature of the fluid in the drain pan is measured, and the fluid density is determined dependent on the measured temperature (step 93'). In step 94', the fluid volume then is calculated by dividing the weight by the determined fluid density, and in step 95', the fluid level is calculated by dividing the fluid volume by the fluid's surface area in the drain pan. If, in step 96', the fluid level is above a predetermined fluid level, e.g., within a range of about 5% of the predetermined full level, a signal is sent to close the fryer vessel drain valve (step 97'), and the fluid level is indicated on a display (step 98'). If, however, the fluid level is not above a predetermined fluid level, the fluid level is indicated on a display (step 99'), and the method returns to step 90'.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and examples be considered as exemplary only, with the true scope and spirit of the invention being indicated by the following claims

I claim:

1. A fryer drain pan fluid level sensing system comprising:
   a fryer frame;
   a fryer vessel mounted on said fryer frame;
   a drain pan carrying frame pivotally affixed at a first carrying frame end to said fryer frame;
   a drain pan mounted on said drain pan carrying frame for receiving a fluid, which has a fluid density, from a fryer vessel, such that said fluid in said drain pan has a fluid level and a surface area, together defining a fluid volume;
   a load sensor for supporting a second carrying frame end opposite said first carrying frame end and for generating a force signal proportionate to a weight of said fluid in said drain pan and said drain pan; and
   a processor for receiving said force signal from said load sensor and for determining said fluid level.

2. The system of claim 1, wherein said processor determines said fluid level by calculating a fluid level factor by comparing a first difference between said force signal and an empty drain pan signal to a second difference between a full drain pan signal and said empty drain pan signal and multiplying said fluid level factor by a predetermined full level.

3. The system of claim 1, wherein said processor determines said fluid level by scaling said force signal to determine a weight of said fluid in said drain pan, by dividing said weight by said fluid density to determine said fluid volume, and by dividing said fluid volume by said surface area to determine said fluid level.

4. The system of claim 1, wherein said second carrying frame end rests upon said load sensor.

5. The system of claim 1, further comprising a load sensor supporting bracket from which said load sensor is suspended above said second carrying frame end, and wherein said load sensor is affixed to said second carrying frame end.

6. The system of claim 1, further comprising a lowpass filter for receiving said force signal from said load sensor and an amplifier for transmitting said filtered load signal to said processor.

7. The system of claim 6, further comprising a display for indicating said fluid level.

8. The system of claim 1, wherein said drain pan further comprises a drain pan filter assembly.

9. The system of claim 1, further comprising a temperature sensor for measuring a temperature of said fluid and for transmitting said measured temperature to said processor, whereby changes in said density of said fluid due to temperature changes are determined by said processor.

10. The system of claim 1, wherein said fluid is selected from the group consisting of a cooking medium, a cleaning fluid, and combinations thereof.

11. The system of claim 10, wherein said cooking medium is selected from the group consisting of vegetable oil, shortening, water, and combinations thereof.

12. The system of claim 10, wherein said cleaning fluid is selected from the group consisting of water, detergent, and combinations thereof.

13. The system of claim 1, wherein said force signal represents about one-half of said weight of said fluid in said drain pan and said drain pan.

14. A fryer comprising a fryer frame, a fryer vessel mounted on said fryer frame, a drain pan carrying frame pivotally affixed at a first carrying frame end to said fryer frame, a drain pan mounted on said drain pan carrying frame for receiving a fluid from a fryer vessel, and a processor for controlling said fryer;
   wherein said fluid has a density, and said fluid has a fluid level and a surface area in said drain pan, together defining a fluid volume;
   wherein a load sensor supports a second carrying frame end opposite said first carrying frame end and generates a force signal proportionate to a weight of said fluid in said drain pan and said drain pan; and
   wherein said processor receives said force signal from said load sensor and determines said fluid level.

15. The fryer of claim 14, wherein said processor determines said fluid level by calculating a fluid level factor by comparing a first difference between said force signal and an empty drain pan signal to a second difference between a full drain pan signal and said empty drain pan signal and multiplying said fluid level factor by a predetermined full level.

16. The fryer of claim 14, wherein said processor determines said fluid level by scaling said force signal to determine a weight of said fluid in said drain pan, by dividing said weight by said fluid density to determine said fluid volume, and by dividing said fluid volume by said surface area to determine said fluid level.

17. The fryer of claim 14, further comprising a drain valve for placing said fryer vessel in communication with said drain pan, wherein said drain valve is controlled by said processor, such that said drain valve is closed when said fluid level reaches a predetermined value.

18. The fryer of claim 14, wherein said second carrying frame end rests upon said load sensor.

19. The fryer of claim 14, further comprising load sensor supporting bracket from which said load sensor is suspended above said second carrying frame end, and wherein said load sensor is affixed to said second carrying frame end.

20. The fryer of claim 14, further comprising a lowpass filter for receiving said force signal from said load sensor and an amplifier for transmitting said filtered load signal to said processor.

21. The fryer of claim 20, further comprising a display for indicating said fluid level.

22. The fryer of claim 14, wherein said drain pan comprises a drain pan filter assembly.

23. The fryer of claim 14, further comprising a temperature sensor for measuring a temperature of said fluid and for transmitting said measured temperature to said processor, whereby changes in said density of said fluid due to temperature change are determined by said processor.

24. A method for determining a level of a fluid in a drain pan of a fryer, said fryer comprising a fryer frame, a fryer vessel mounted on said fryer frame, a drain pan carrying frame pivotally affixed at a first carrying frame end to said fryer frame, a drain pan for receiving a fluid from a fryer vessel, and a processor for controlling said fryer;

wherein said fluid has a density, and said fluid has a fluid level and a surface area in said drain pan, together defining a fluid volume;

wherein a load sensor supports a second carrying frame end opposite said first carrying frame end; comprising the steps of:

measuring a predetermined full level when said drain pan is full and said full drain pan signal is generated;

generating a force signal proportionate to a weight of said fluid in said drain pan and said drain pan;

calculating a fluid level factor by comparing a first difference between said force signal and an empty drain pan signal to a second difference between a full drain pan signal and said empty drain pan signal; and multiplying said fluid level factor by said predetermined full level.

25. A method for determining a level of a fluid in a drain pan of a fryer, said fryer comprising a fryer frame, a fryer vessel mounted on said fryer frame, a drain pan carrying frame pivotally affixed at a first carrying frame end to said fryer frame, a drain pan for receiving a fluid from a fryer vessel, and a processor for controlling said fryer;

wherein said fluid has a density, and said fluid has a fluid level and a surface area in said drain pan, together defining a fluid volume;

wherein a load sensor supports a second carrying frame end opposite said first carrying frame end; comprising the steps of:

generating a force signal proportionate to a weight of said fluid in said drain pan and said drain pan;

determining said weight of said fluid by scaling said force signal;

calculating said fluid volume by dividing said fluid weight by said fluid density; and calculating said fluid level by dividing said fluid volume by said fluid surface area.

* * * * *